United States Patent
Battigelli et al.

[11] Patent Number: 6,158,249
[45] Date of Patent: Dec. 12, 2000

[54] APPARATUS FOR MANUFACTURING MINERAL WOOL

[75] Inventors: Jean Battigelli, Rantigny; Jean-luc Bernard; Guy Berthier, both of Clermont, all of France; Hans Furtak, Speyer/Rhein, Germany

[73] Assignee: Isover Saint-Gobain, Courbevole, France

[21] Appl. No.: 08/712,964

[22] Filed: Sep. 12, 1996

Related U.S. Application Data

[62] Continuation of application No. 08/428,794, Apr. 24, 1995, abandoned, which is a continuation of application No. 08/039,060, filed as application No. PCT/EP92/01754, Aug. 3, 1992, abandoned.

[30] Foreign Application Priority Data

Aug. 2, 1991 [FR] France .................................. 91 09827

[51] Int. Cl.[7] .................................................. C03B 37/04
[52] U.S. Cl. ............................................... 65/522; 65/523
[58] Field of Search ........................................ 65/522, 573

[56] References Cited

U.S. PATENT DOCUMENTS

| | | | |
|---|---|---|---|
| 2,981,974 | 5/1961 | Levecque | 65/522 |
| 3,012,281 | 12/1961 | Stalego | 65/522 |
| 3,048,886 | 8/1962 | Firnhaber et al. | |
| 3,273,358 | 9/1966 | Kleist | 65/522 |
| 3,304,164 | 2/1967 | Charpentier | 65/522 |
| 3,785,791 | 1/1974 | Perry | 65/522 |
| 3,928,009 | 12/1975 | Perry | 65/522 |
| 4,203,745 | 5/1980 | Battigelli | 65/522 |
| 4,203,747 | 5/1980 | Fezenko | |
| 4,203,748 | 5/1980 | Battigelli | 65/522 |
| 4,203,774 | 5/1980 | Battigelli | |
| 4,392,878 | 7/1983 | Okuma | 65/522 |
| 4,396,722 | 8/1983 | Rapp | 501/35 |
| 4,402,767 | 9/1983 | Hinze et al. | |
| 4,451,276 | 5/1984 | Barthe | |
| 4,534,774 | 8/1985 | Herschler | 65/522 |
| 4,534,779 | 8/1985 | Herschler | |
| 4,560,606 | 12/1985 | Rapp | |
| 4,689,061 | 8/1987 | Britts | 65/522 |
| 4,698,086 | 10/1987 | Fachat et al. | 65/16 |
| 5,154,746 | 10/1992 | Okuma | 65/522 |

FOREIGN PATENT DOCUMENTS

| | | |
|---|---|---|
| 0054933 | 6/1982 | European Pat. Off. . |
| 0 235 897 | 9/1987 | European Pat. Off. . |
| 0260465 | 3/1988 | European Pat. Off. . |
| 0325760 | 8/1989 | European Pat. Off. . |
| 0399320 | 11/1990 | European Pat. Off. . |
| 0484211 | 5/1992 | European Pat. Off. . |
| 1192563 | 10/1959 | France . |
| 2091493 | 1/1972 | France . |
| 2211408 | 7/1974 | France . |
| 2662687 | 12/1991 | France . |
| 878026 | 9/1961 | United Kingdom . |
| 895540 | 5/1962 | United Kingdom . |
| 2220654 | 1/1990 | United Kingdom . |

OTHER PUBLICATIONS

Ceramic Bulletin, vol. 55, No. 6, pp. 579–582 (1976), George H. Beall and Hermann L. Rittler.

*Primary Examiner*—John Hoffmann
*Attorney, Agent, or Firm*—Sughrue, Mion, Zinn, Macpeak & Seas, PLLC

[57] ABSTRACT

The only methods hitherto available for the production of mineral wool from materials such as basalt either utilize a stationary nozzle (blast drawing method) or external centrifuging whereby unsatisfactory yield and/or a not entirely satisfactory fiber quality, particularly with regard to a high content of unfiberized components, are achieved. By way of the invention, application of a fiberization method is suggested which, in spite of a high fluidity of the molten mineral material such as basalt, arrives at high quality fibers with a low bead proportion at good yield. This is made possible by selection of specific materials and their fiberization in specific conditions. Whereas fiberization of these fluid materials is carried out in external centrifuging at viscosities of a few tens of poises, fiberization by internal centrifuging at viscosities of more than 100 poises is required, according to the: invention, in order to achieve a mineral wool for insulation purposes with a low bead content.

27 Claims, 10 Drawing Sheets

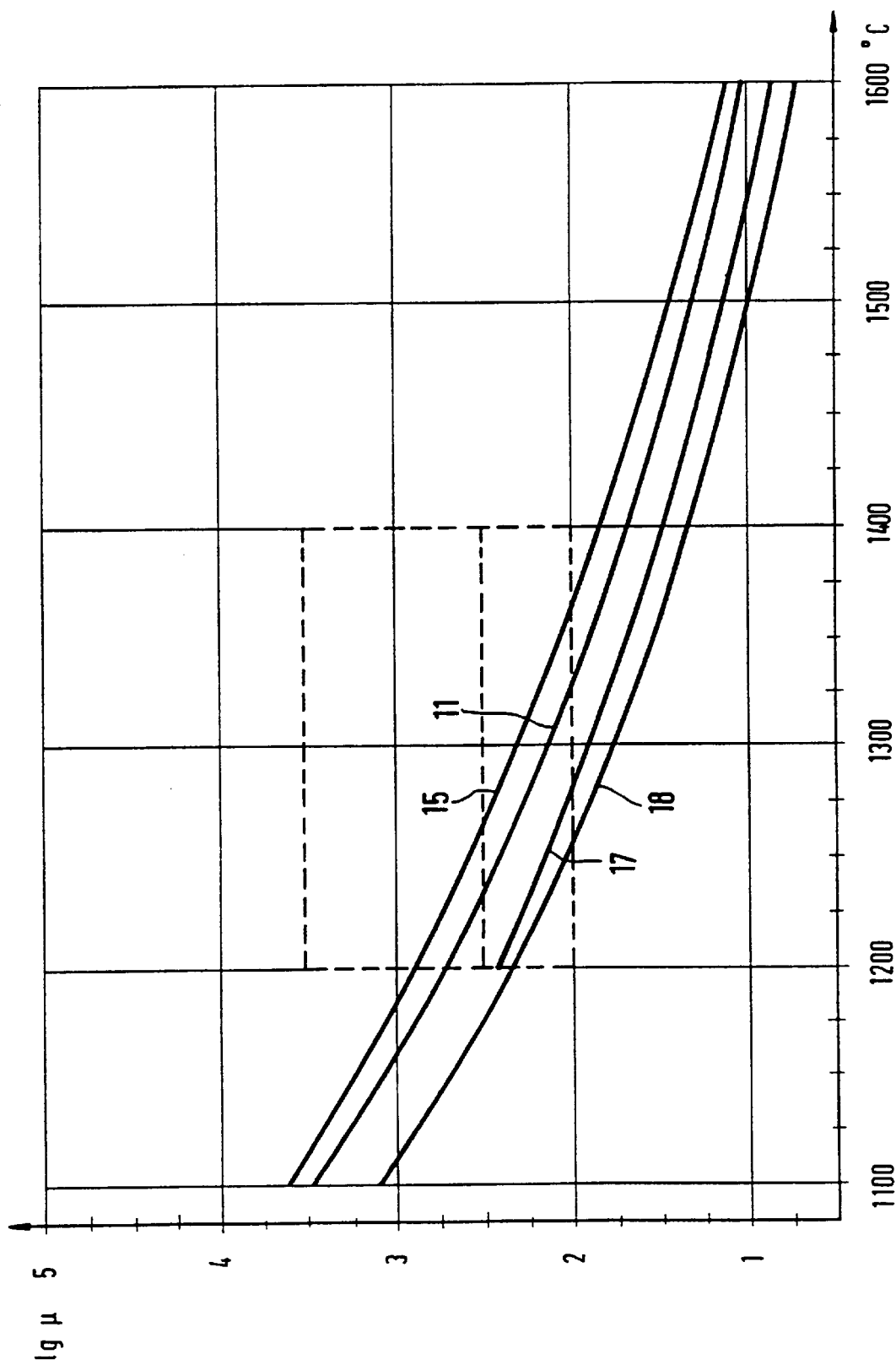

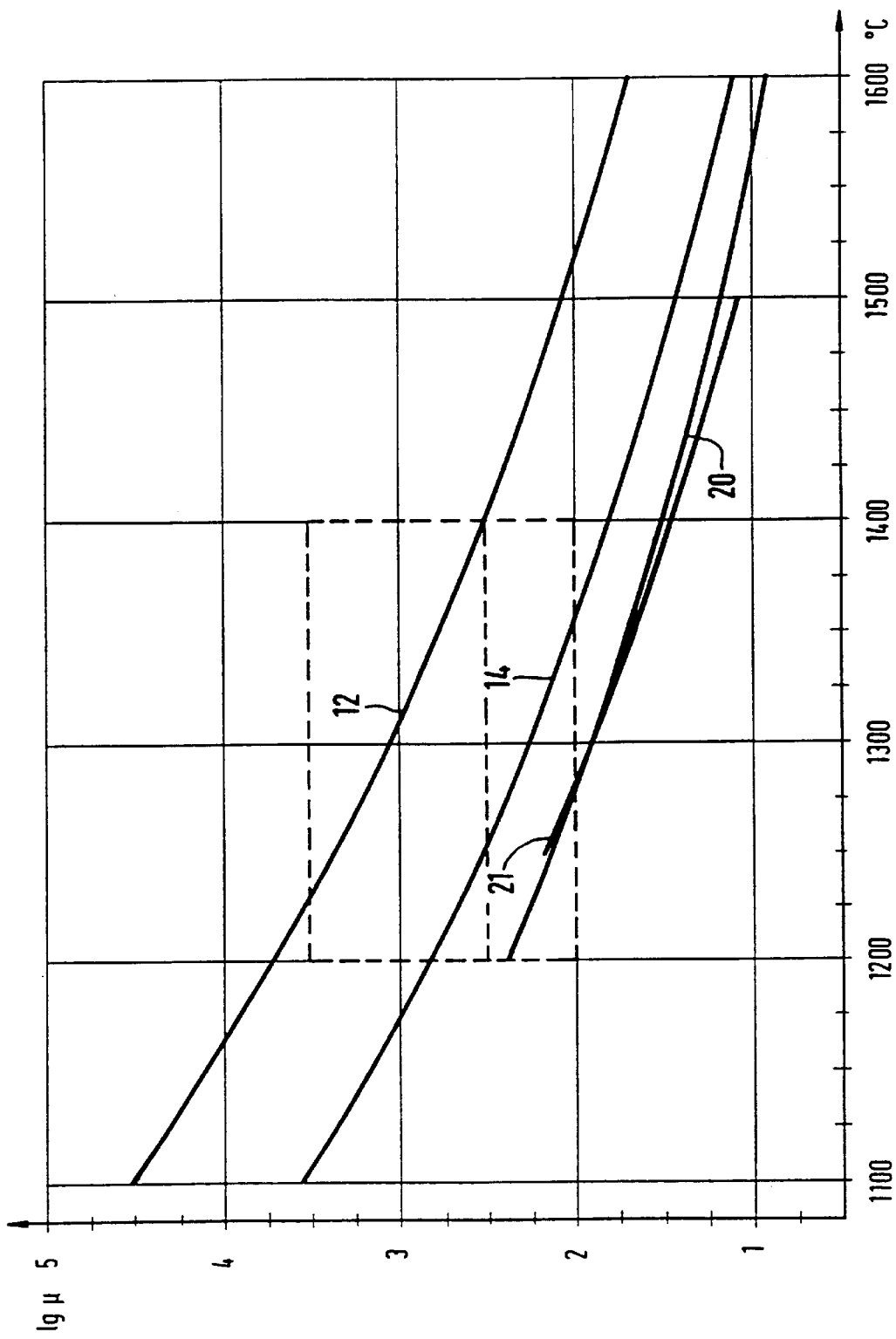

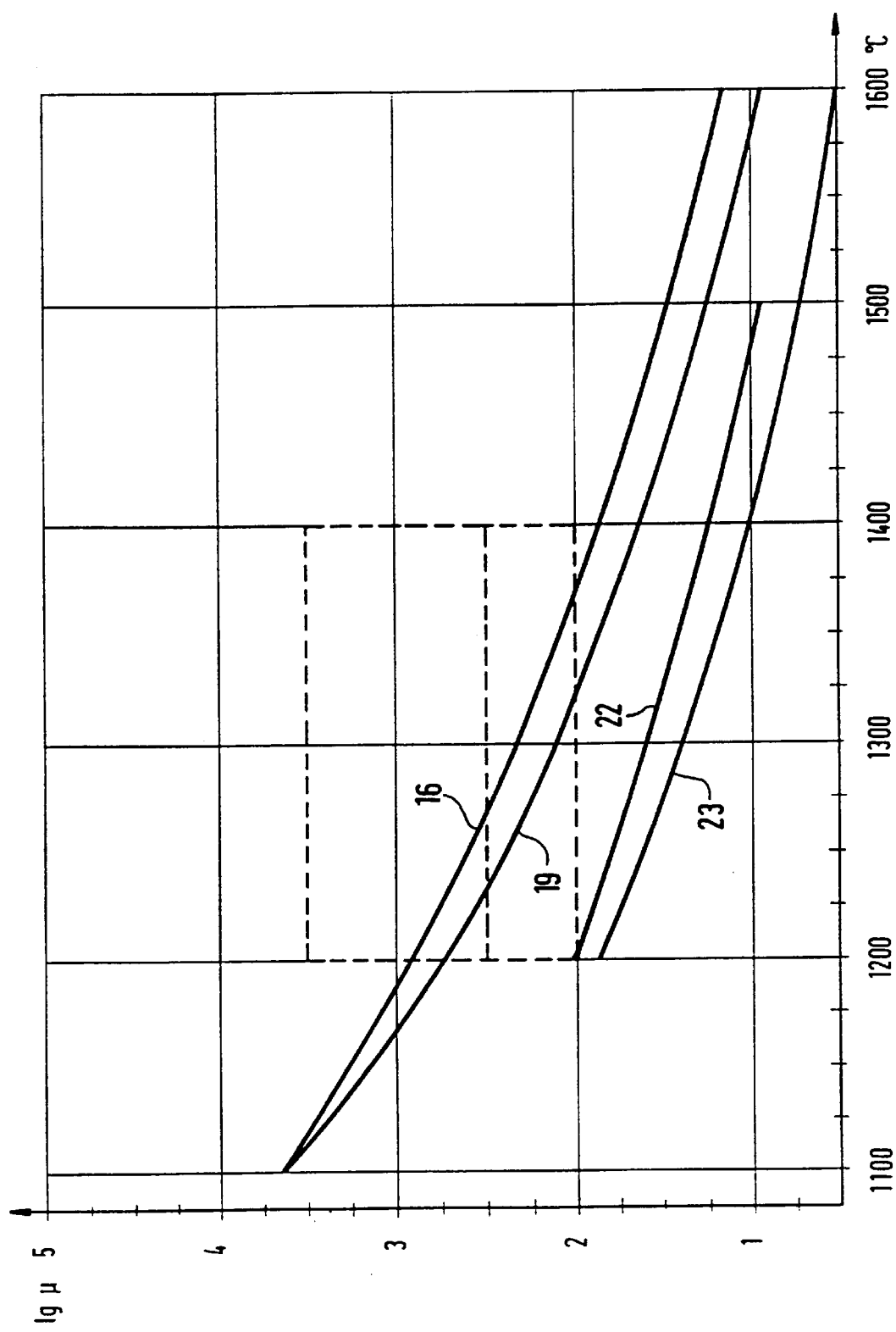

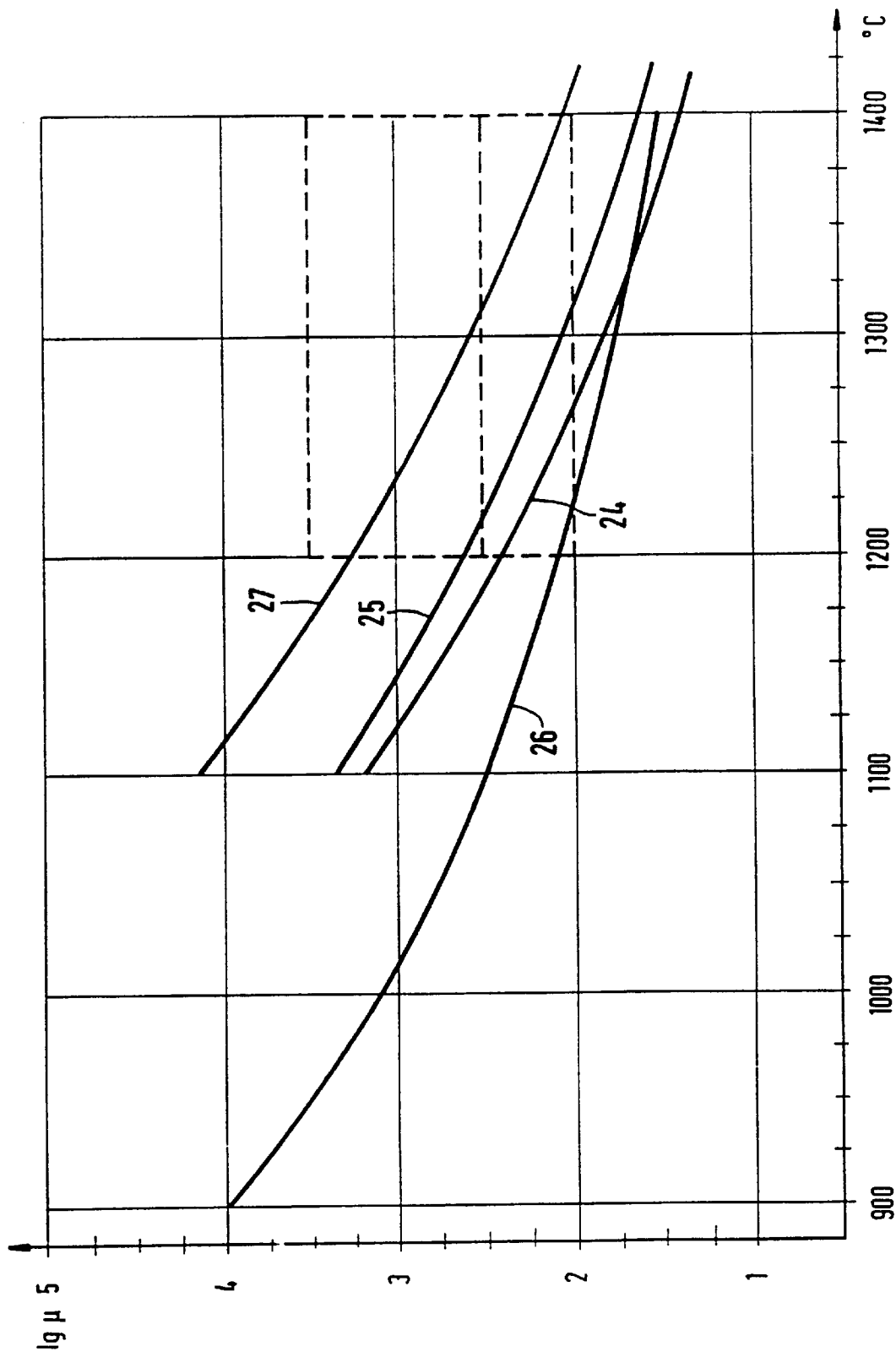

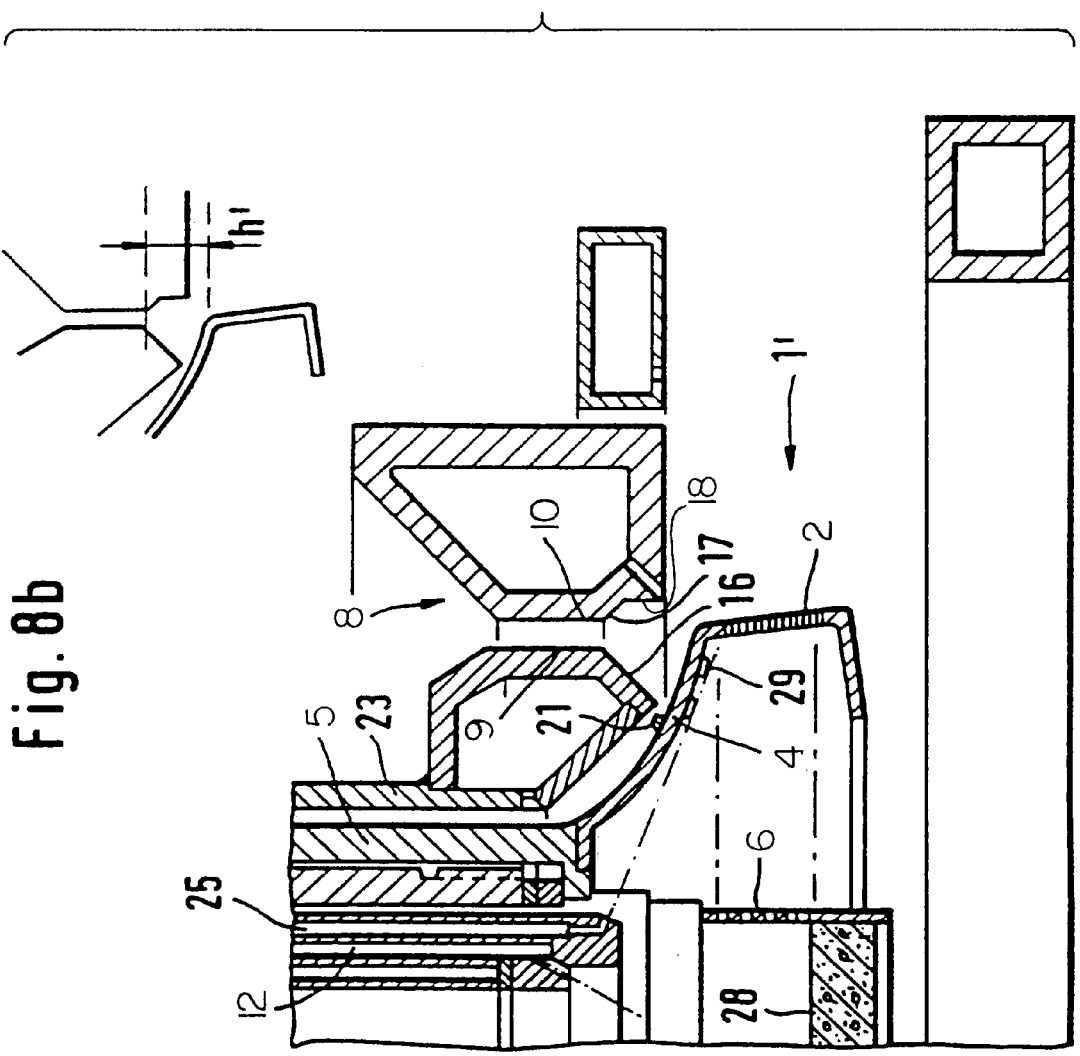

APPARATUS FOR MANUFACTURING MINERAL WOOL

This is a Continuation of application Ser. No. 08/428,794 filed Apr. 24, 1995, now abandoned, which is a Continuation of application Ser. No. 08/039,060, filed Apr. 1, 1993, now abandoned, which was the National Stage of International Application No. PCT/EP92/01754 filed Aug. 3, 1992.

FIELD OF THE INVENTION

The invention concerns a method for producing fibers from thermoplastic mineral materials with high melting points or high liquidus temperatures, further a mineral wool mat formed from such mineral wool, and a fiberizing device suited for carrying out the process. The materials comprise basalts, glasses as gained from by-products of the iron and steel industry like blast furnace slags (scoriae), or similar raw materials with altogether considerably higher melting or liquidus temperatures and much lower viscosities at their respective liquidus temperatures when compared with the glasses used for the production of glass wool. For the sake of simplicity, these raw materials shall merely be designated as "materials" in the following.

BACKGROUND OF THE INVENTION

The materials in question are used on a large scale for the production of mineral wool which is in particular intended for thermal and acoustic insulation.

On one hand, the reasons why these materials are chosen can be found in their low costs, and on the other hand in their properties, especially their good resistance against high temperatures. Their production, however, creates specific problems. These problems particularly stem from the conditions in which these materials are workable.

Their high melting temperatures already present a difficulty in itself. The melting temperature is the temperature to which the raw materials have to be heated to guarantee melting. Furthermore, where production is concerned, it is the temperature above which the material must be kept in order to flow through the fiberizing device.

Another particularity discerning these materials from the glasses traditionally used for fiber production is that, as a rule, they are highly fluid at temperatures very close to their liquidus temperatures. The resulting difficulties shall be explained in the following.

Also due to the required high temperatures, the devices getting into contact with the materials to be fiberized are subject to very intensive corrosion. Operational lifetime of these devices presents a problem even with conventional glasses. The problem becomes even more critical with high liquidus materials.

Hitherto, the above-mentioned difficulties meant that only certain fiberizing techniques could be applied with the materials in question. There are essentially two kinds of techniques: those employing centrifuging, or spinning off, of the molten mineral material, and those where the material is fed through a stationary nozzle and attenuated into fibers by gas flows often accelerated to supersonic speeds (blast drawing method).

For techniques applying a fixed nozzle, it is necessary to utilize a nozzle which is able to resist the attack of the molten mineral material. Usually, these are platinum nozzles able to withstand these attacks even at such high temperatures. Production capacity of each nozzle, however, is limited. In addition, the attenuating gas flows required generate comparatively high energy costs.

Techniques employing centrifuging, or spinning off, allow considerable production quantities per unit. Those are techniques summarized under the generic term "external centrifuging", in order to indicate that the molten mineral material remains outside the spinner. The molten mineral material is either applied to the front surface of a disk or to the peripheral surface of a cylindrical rotor, or a plurality thereof. An advantage of these techniques is the simplicity of the parts of the device entering into contact with the molten mineral material. With respect to this relative simplicity, the parts in question, in particular the spinner rims, are relatively cheap and therefore permit exchange within relatively short time spans. The proportion of material costs figuring among total production costs remains relatively low. The fact that these device parts are subject to intensive wear upon contact with the molten mineral material does therefore not turn out to be an obstacle.

The main disadvantage of mineral fiber production by external centrifuging lies in the fact that the properties of the final product, at equal fiber quantities, are inferior to those of glass wool which is mainly produced by so-called "internal centrifuging".

In external centrifuging, the material flows onto the spinning wheels and is flung off them as a multiplicity of droplets. The fiber apparently forms once it is flung off, between the surface of the spinner and the droplet drawing the fiber after it. It is obvious that with such a fiberizing mechanism, a considerable portion of the spun-off materials remains in the form of unfiberized particles. Their proportion can be as high as 40 weight percent for particle sizes of more than 100 $\mu$m of the starting material. Although several methods are available for separating the unfiberized particles, the finished mineral wool is never entirely free of such particles which at best are of no use, and very much of a nuisance for particular applications.

It should be pointed out that drop formation is not exclusively the result of external centrifuging, but depends also on the rheological characteristics of the materials in question. Materials processed according to the invention generally have comparatively low viscosities, even at temperatures only slightly above liquidus temperature. The molten mineral material, which is relatively fluid, is difficult to fiberize as the filaments have a tendency to break and to form drops or beads. In a way, the technique of external centrifuging relies on this tendency, however without eliminating its disadvantages.

SUMMARY OF THE INVENTION

One essential objective of the present invention is to provide a process for producing fibers from a material with elevated liquidus temperature and low viscosity which, at high yield, enables the production of a mineral wool largely free of unfiberized particles.

By way of the invention, it is shown that it is possible to produce mineral fibers of a material of the kind in question by spinning the molten mineral material off a spinner with a large number of small-diameter orifices in its peripheral wall, with the molten mineral material being spun off the spinner through these orifices in the form of filaments under the influence of the centrifugal force. In the method according to the invention, the filaments spun off by the spinner are, as the case may be, engaged by a gas flow which supplementarily attenuates the filaments, unless a different fiberizing process with internal centrifuging and without the use of a attenuating gas flow is utilized.

Application of the internal centrifuging technique for the materials in question has heretofore not been taken into consideration. Several reasons supported the opinion that such internal centrifuging techniques are not suitable for these materials. Problems are mainly related to the conditions for satisfactory attenuation of fibers.

As mentioned above, the materials in question are characterized by relatively high liquidus temperatures and very low viscosities at the same time., They are already comparatively fluid at their respective melting temperatures and have viscosities of less than 3,200 poises at melting point. In this, they are different from the glasses usually processed by internal centrifuging methods. Viscosity of these glasses is as high at liquidus temperature as in the order of 5,000 poises, with viscosities of 1,000 poises or more prevailing even when fiberized distinctly above their liquidus temperatures. According to the invention, however, materials with very low viscosities even at their liquidus temperatures are to be fiberized. Surprisingly it was found that fiberization of such materials with low contents of beads is successful with internal centrifuging if a material is selected to have a viscosity of at least 100 poises within the working range, i.e. in particular between 1,200° C. and 1,400° C., and if this material is then fiberized at a viscosity of more than 100 poises.

The materials utilized according to invention are generally transformed into the molten state only above 1,200° C., and are highly fluid at their respective melting temperature; in particular, their viscosity $\mu$ as a rule is less than 3,200 poises (1 g $\mu$<3.5) at liquidus temperature, in particular even below 1,000 poises (1 g $\mu$<3).

The internal centrifuging techniques for the production of glass fibers described in prior art contain relatively precise indications about process temperatures. They are less precise with reference to rheological points of view, regarding the fact that the traditional glass compositions, at the examined temperatures, show viscosities which are well suited for the attenuating process. Viscosity at fiberizing temperature of normal glass, which in practice always lies above liquidus temperature, is not too high, wherefore attenuation of the fibers with relatively small forces is possible. Neither is viscosity at liquidus temperature—and therefore also slightly above it—too low in the case of usual glass which, under the influence of a surface tension less and less compensated for by viscosity at reduced fiber diameters, would result in breaking and formation of drops and beads. It follows that the viscosity of usual glass compositions can be selected easily from within the range above liquidus temperature such that during fiberization by means of internal centrifuging, a suitable viscosity of, for example, 1,000 poises or more is provided.

As explained earlier, the materials in question, compared with glasses, are already fluid to such an extent at liquidus temperature that satisfactory attenuation of the molten material may not be expected with "inner centrifuging".

BRIEF DESCRIPTION OF THE DRAWINGS

FIG. 4 is a viscosity/temperature diagram for compositions 11, 15, 17 and 18 in the Table at page 41;

FIG. 5 is a viscosity/temperature diagram for compositions 12, 14, 20 and 21 in the Table at pages 41–42;

FIG. 6 is a viscosity/temperature diagram for compositions 16, 19, 22 and 23 in the Table at pages 41–42;

FIG. 7 is a viscosity/temperature diagram for compositions 24–27 in the Table at pages 41–42;

FIG. 8b is a representation, corresponding to FIG. 8a, of an embodiment of a fiberization device according to the invention.

DETAILED DESCRIPTION OF THE INVENTION

Figure 1:
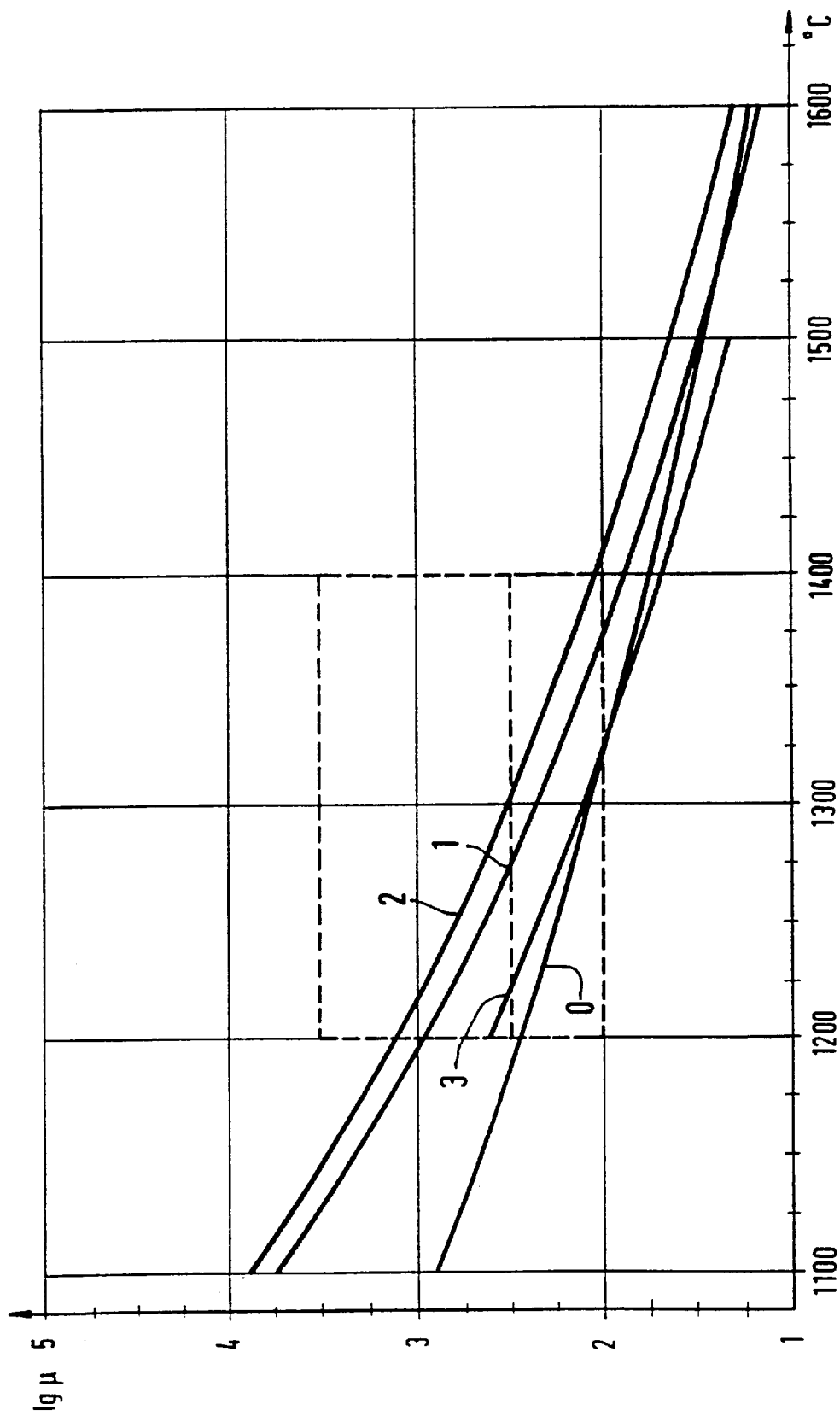
FIG. 1 is a viscosity/temperature diagram for compositions 1–3 in the Table at page 41.
Figure 2:
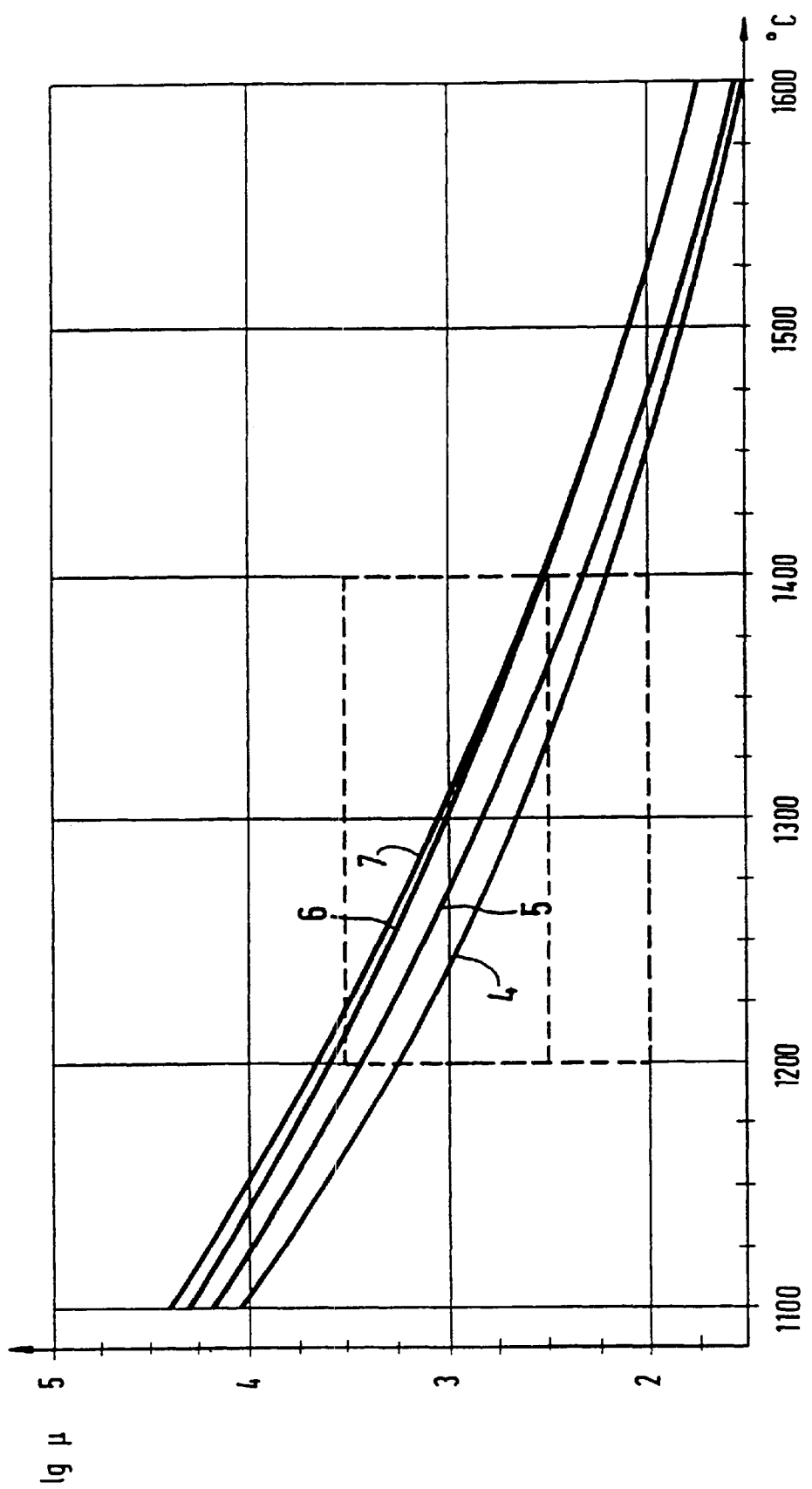
FIG. 2 is a viscosity/temperature diagram for compositions 4–7 in the Table at page 41.
Figure 3:
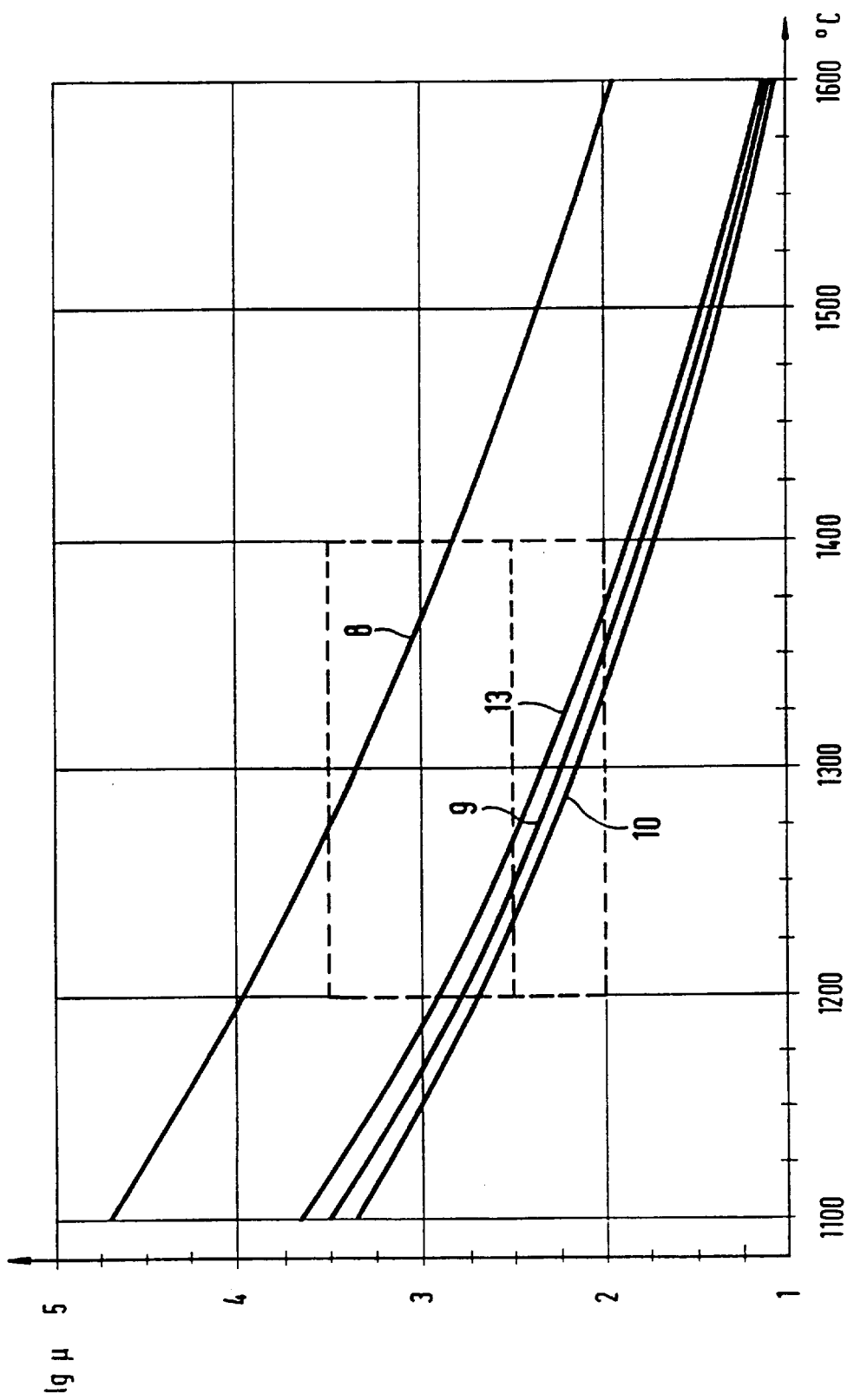
FIG. 3 is a viscosity/temperature diagram for compositions 8–10 and 13 in the Table at page 41.

The present invention shows that it is surprisingly possible to process highly fluid materials with high liquidus temperatures by "internal centrifuging" if a certain selection among all of the materials in question is made with regard to their viscosity at liquidus temperature, and if fiberization of the material is conducted under specific conditions.

The method according to the invention for producing mineral fibers of the materials in question is, first of all, to select materials with liquidus temperatures below 1,400° C. and viscosities of more than 100 poises, specifically between 100 and 3,000 poises, in the temperature range between 1,200° C. and 1,400° C., and to feed this molten mineral material into a spinner, the peripheral wall of which is provided with a multiplicity of orifices for the emanation of the molten mineral material wherefrom filaments of molten mineral material are spun off with a viscosity adjusted to more than 100 poises, and, as the case may be, subjected to an attenuating gas flow for forming the fibers. Fiberization is then effected inside a work range between 1,200° C. and 1,400° C. wherein viscosity is above 100 poises; the latter, upper temperature limit is under consideration of spinner lifetime problems.

During the tests leading up to the present invention, it was found that the range of viscosity to be applied for internal centrifuging of the materials in question under practical conditions must be above 100 poises, whereas this material is subjected to fiberization by external centrifuging at essentially lower viscosities of several tens of poises. At more than 3,000 poises, viscosity impedes emanation of the material through the spinner orifices and attenuation into fibers. Below 100 poises, the difficulty results from the hazard of insufficient fiber formation, such that filaments may break and form drops or beads.

The molten mineral material inside the spinner is kept at a temperature preventing its solidification. It is even necessary to maintain a higher temperature than the temperature to be assumed theoretically, in order to account for hardly controllable local temperature fluctuations. In order to avoid any risk of initial solidification inside the spinner, an adequate temperature fluctuation range of several tens of degrees is assumed. A safety margin of about 50° C. is preferred, bringing about a preferred selection of materials with viscosities above 100 poises—within a temperature zone with a width of at least 50° C.—inside the total range between 1,200° C. and 1,400° C. As a result, viscosity never drops below 100 poises due to temperature fluctuations within this temperature zone.

Materials which are usable according to the invention are in particular natural basalts, but also similar compositions such as those obtained when composites are added to a basalt with the purpose of influencing certain ones of its properties. Also usable are compositions like those achieved by the combination of materials that possess the main properties of basalts, in particular their thermal behavior and in particular the quality that melting is achieved at a temperature which, as a rule, does not lie below 1,200° C. These are also mineral compositions, such as blast furnace slags or all those compositions used for the production of so-called rock wool. Process steps according to the invention may also be applied to compositions qualifying for the term "vitreous". These latter ones are so-called "hard glasses" with similar, extremely low viscosities at liquidus temperature, with the term "hard" furthermore pointing out relatively high liquidus temperatures which make such glasses suited for applications at relatively high temperatures.

Basalts and the minerals to be utilized within the framework of the invention are basically characterized in that, other than glass compositions, they have a relatively low content of alkaline earth metals. This content usually does not exceed 10 weight percent, and mostly lies below 5 weight percent of alkali oxides. This low alkali metal content is one of the reasons why melting occurs only at relatively high temperatures. On the other hand, the content of alkaline earth metals, especially of CaO, is higher than in glass compositions. It is usually not below 9 weight percent. The total content of alkaline earth metals may amount to 35 weight percent or more. For the most commonly used materials of the kind in question, this content ranges between 9 and 30 weight percent.

As regards components of a $SiO_2$ or $Al_2O_3$ structure, basalts are usually richer in aluminum oxide and correspondingly less rich in silica than glass compositions.

Basalts are also considerably different from glass compositions because of their higher iron oxide contents. For true basalts, this oxide content lies above 3 weight percent, and usually in excess of 6 weight percent.

Basalts and minerals which are usable according to the invention have compositions with the following main composites:

| | |
|---|---|
| $SiO_2$ | more than 45 weight percent |
| CaO + MgO | between 9 and 35 weight percent |
| $Na_2O + K_2O$ | less than 10 weight percent |

Compositions preferred according to the invention, in particular those of the basaltic type, have the compositions represented in the following table. Indications are made in weight percents, and as a matter of course, minor divergences from the following concrete figures are frequently without a negative effect.

| | | | | | | | | | |
|---|---|---|---|---|---|---|---|---|---|
| $SiO_2$ | 50.45 | 51.5 | 52.9 | 54.93 | 56.0 | 52.26 | 49.40 | 47.90 | 47.5 |
| $Fe_2O_3$ | 10.35 | 10.1 | 15.2 | 8.3 | 12.18 | 7.6 | 10.10 | 9.80 | 9.7 |
| $Al_2O_3$ | 17.35 | 18 | 13.6 | 17.17 | 14.37 | 18.96 | 17.00 | 16.40 | 16.3 |
| MnO | 0.17 | 0.19 | 0.2 | 0.15 | 0.23 | 0.1 | 0.15 | 0.15 | 0.16 |
| CaO | 9.90 | 8.9 | 5.75 | 7.12 | 6.3 | 6.52 | 9.70 | 9.4 | 12.4 |
| MgO | 7.05 | 6.4 | 3.8 | 5.10 | 4.48 | 4.31 | 6.90 | 6.70 | 6.7 |
| $Na_2O$ | 3.35 | 3.5 | 2.7 | 3.55 | 3.2 | 5.52 | 3.25 | 3.15 | 3.20 |
| $K_2O$ | 0.45 | 0.61 | 2.20 | 2.19 | 1.49 | 4.11 | 0.45 | 0.40 | 0.40 |
| $TiO_2$ | 0.75 | 0.66 | 3.0 | 1.20 | 1.33 | 0.5 | 0.75 | 0.70 | 0.70 |
| $P_2O_5$ | 0.15 | 0.12 | 0.6 | 0.28 | 0.34 | 0.1 | 0.15 | 0.14 | 2.9 |
| $B_2O_3$ | — | — | — | — | — | — | 2.15 | 5.25 | — |

| | | | | | | |
|---|---|---|---|---|---|---|
| $SiO_2$ | 52.60 | 46.55 | 48.77 | 50.80 | 58.54 | 58.3 |
| $Fe_2O_3$ | 8.75 | 8.78 | 8.80 | 8.80 | 0.19 | 0.14 |
| $Al_2O_3$ | 14.58 | 14.7 | 14.65 | 14.65 | 3.85 | 7 |
| MnO | 0.12 | 0.17 | 0.17 | 0.17 | 0.03 | |
| CaO | 12.20 | 12.25 | 12.25 | 12.25 | 25 | 24.85 |
| MgO | 6.33 | 6.2 | 6.2 | 6.2 | 9.25 | 5 |
| $Na_2O$ | 2.24 | 2.2 | 2.2 | 2.2 | 0.05 | 0.02 |
| $K_2O$ | 1.05 | 1.02 | 1.02 | 1.01 | 0.08 | 0.05 |
| $TiO_2$ | 1.82 | 1.89 | 1.9 | 1.9 | 0.02 | 0.14 |
| $P_2O_5$ | 0.30 | 6.21 | 4 | 2 | 2.85 | 4.5 |
| $B_2O_3$ | — | — | — | — | 0.05 | |

According to the invention, it is possible to obtain a fiber mat by internal centrifuging of compositions of this kind with a Micronaire value of F/5 g below 6, preferably between 2.5 and 4, with the proportion of beads or unfiberized particles larger than 100 μm amounting to less than 10 weight percent and even less than 5 weight percent, which constitutes an extraordinarily low bead content. As previously mentioned, even the "hard" glasses may be processed advantageously with the procedural steps according to the invention as they, too, have very low viscosities at their liquidus temperatures and consequently require the same conditions for fiberization. One example of such a glass composition is:

| | |
|---|---|
| $SiO_2$ | 60.7% (wt.) |
| CaO | 16.5% (wt.) |
| $Na_2O$ | 15.4% (wt.) |
| $Al_2O_3$ | 0.2% (wt.) |
| MgO | 3.2% (wt.) |
| $K_2O$ | 0.7% (wt.) |
| $B_2O_3$ | 3.3% (wt.) |

Other compositions similar to those compositions traditionally utilized for rock wool production may equally be used, however under somewhat more difficult conditions; here, a bead content as high as, for instance, 10 weight percent must be accepted. Nevertheless, according to the invention, a mineral wool mat may be realized with a Micronaire value below 6/5 g and a proportion of unfiberized particles with sizes larger than 100 μm that is below 10 weight percent, the composition being in the vicinity of one of the following compositions given in weight percent:

| | | | | | |
|---|---|---|---|---|---|
| $SiO_2$ | 47.01 | 56.3 | 61.2 | 53 | 49.3 |
| $Fe_2O_3$ | 12.1 | 0.25 | 6.1 | 2.7 | 8.4 |
| $Al_2O_3$ | 14.7 | 3.15 | 0.1 | 6.4 | 15.6 |
| MnO | 0.24 | — | 0.01 | | |
| CaO | 10.1 | 26.1 | 18.6 | 30 | 13.9 |
| MgO | 8.6 | 6.4 | 9.3 | 3 | 7.6 |
| $NA_2O$ | 3.06 | 3.2 | 4.5 | 3.1 | 3.5 |
| $K_2O$ | 1.40 | 0.65 | 0.04 | 1.1 | 0.5 |
| $TiO_2$ | 2.6 | 0.1 | 0.14 | 0.5 | 1.0 |
| $P_2O_5$ | — | 2.9 | — | 0.2 | |
| $B_2O_3$ | — | — | — | | |

Traditional spinners are often not suited for processing the highly fluid materials with high liquidus temperatures which are to be used according to the invention. As already mentioned earlier on, the usual heat resistant alloys such as nickel-chromium alloys have too low a resistance against temperatures in excess of 1,100° C. or even 1,050° C.

Application limitations are of several kinds.

One first limitation concerns deformation under the influence of heat. The resistance against creep of conventional heat resistant alloys is insufficient above 1,100° C. Considering the operating conditions of spinners, an insufficient resistance leads in particular to deformation of the peripheral wall. It bulges increasingly and noticeably changes the conditions under which fibers are formed, consequently adversely affects the regularity and homogeneity of the final product. Although able to run without being damaged for several hundreds of hours at temperatures in the order of 1,050° C., the usual spinners will, however, be worn out within a few hours at temperatures in excess of 1,100° C. and even more above 1,200° C.

Another important factor with reference to spinners is their capability to resist corrosion. What is important here is that corrosion increases in proportion with temperature.

In the course of the work leading to the invention, it was found that the suitable choice of an alloy for the spinner allows to comply on a large scale with the requirements to the resisting ability of this material, even under the extreme conditions brought about by processing high liquidus compositions.

It was found that by means of oxide dispersion strengthened—short "ODS"—alloys, resistance to creep and resistance to corrosion can be increased at the same time, all this even at those temperatures required for fiberization of the materials according to the invention.

Heretofore, ODS alloys have been utilized for industrial spinners under the aspect of improving operational lifetime under operational conditions equalling those in traditional glass wool production. As far as is known, however, industrial application did not ensue. It has to be assumed that the advantages realized through the utilization of such spinners for processing glass compositions do not make up for the additional costs through choice of an ODS alloy.

Furthermore, choosing an ODS alloy alone is not enough to fulfill all the requirements for satisfactory fiberization of the material in question by "internal centrifuging". Utilization of an ODS alloy spinner for processing high liquidus compositions therefore is a measure also not easily to be considered.

Here it first had to be found in the course of the work leading to the invention that, in order to achieve optimal resistance to creep at high temperatures, and generally to achieve optimal heat resisting properties, it is necessary to utilize ferritic ODS alloys.

In the course of the work leading to the invention, it was further found that in the choice of an ODS alloy it may be necessary to take the kind of composition to be processed into account. The main difference with reference to the kind of composition lies in the presence or absence of a high iron content. It was found, in particular, that ferritic alloys offer good resistance to corrosion when used with compositions having a relatively high ferrous oxide content, whereas these same alloys are corroded rapidly by glass compositions practically without iron content.

Under practical conditions, ferritic alloys are not advantageous for processing compositions containing less than 3 weight percent of iron oxide.

For compositions rich in iron, such as basalts and stones in general, ferritic ODS alloys offer the advantages of good resistance to corrosion and good mechanical behavior, thus allowing operation at temperatures in the order of 80 to 100° C. above those temperatures at which other ODS alloys, still rated to be extraordinarily heat resistant, may be operated. Ferritic ODS alloys, for instance, allow satisfactory processing at temperatures which may be as high as 1,400° C.

For compositions to be fiberized which do not require extreme process temperatures, namely such able to be processed at 1,300° C. to 1,350° C. or less, for instance, a less heat resistant ODS alloy may be selected. In this sense, austenitic alloys based on nickel-chromium may be utilized advantageously. These alloys furthermore offer good resistance to corrosion as well as to compositions either poor or rich in iron.

The ferritic ODS alloys according to the invention for processing at maximum temperatures traditionally have an iron content of more than 65 weight percent. Beside iron, these alloys usually contain chromium and aluminum.

The oxide preferably dispersed in the ODS alloy is yttrium oxide. The oxide content in such materials is usually very low. Normally, it is less than 1 weight percent of the alloy.

Ferritic ODS alloys utilized for manufacturing spinners, specially for fiberization of compositions rich in iron, have a composition with these main components:

| | |
|---|---|
| Cr | 13 to 30% (wt.) |
| Al | 2 to 7% (wt.) |
| Ti | less than 1% (wt.) |
| $Y_2O_3$ | 0.2 to 1% (wt.) |
| Fe | remainder |

A preferred alloy consists of:

| | |
|---|---|
| Fe | 74.5% (wt.) |
| Cr | 20% (wt.) |
| Al | 4.5% (wt.) |
| Ti | 0.5% (wt.) |
| $Y_2O_3$ | 0.5% (wt.) |

Utilized austenitic alloys are practically free of iron. They furthermore have practically no aluminum. The yttrium oxide content lies in the same range as that of ferritic alloys.

Suitable austenitic alloys may, for instance, have a following composition:

| | |
|---|---|
| Cr | 15 to 35% (wt.) |
| C | 0 to 1% (wt.) |
| Al | 0 to 2% (wt.) |
| Ti | 0 to 3% (wt.) |
| Fe | less than 2% (wt.) |
| $Y_2O_3$ | 0.2 to 1% (wt.) |
| Ni | remainder |

Production of the ODS alloys and shaping of the workpieces based on these alloys may follow techniques known per se.

Ceramic materials are another category of usable spinner materials. The usable monolithic ceramic materials, in particular silicon nitride of the RBSN type (Reaction Bonded Silicon Nitride obtained by reaction sintering of a silicon powder in nitrogen atmosphere), of the $Si_3N_4$ or SIALON types for instance of the following chemical composition, are:

| | |
|---|---|
| Si | 49.4% (wt.) |
| Al | 4.2% (wt.) |
| Y | 7.25% (wt.) |

-continued

| | |
|---|---|
| O | 4.0% (wt.) |
| N | 35.0% (wt.) |
| Fe | <2,000 ppm |
| Ca + Mg | <1,000 ppm |

Other silicon nitrides can equally be used. The workpiece may for instance be obtained by sintering, with this work procedure also allowing to obtain workpieces with relatively complex shapes an the possibility of preparing the orifices from the beginning by keeping them free by means of rods which are extracted after the workpiece has been formed, with the diameters of orifices finally being finished with a diamond tool. Preferably, non-porous ceramic materials are used the bulk density of which is as close as possible to their theoretical maximum density, thereby resulting in less easily corroding workpieces. This kind of material may be used up to temperatures in the vicinity of 1,300° C.

Another category of ceramic materials usable within the scope of the invention are composites with a ceramic matrix and fiber reinforcement which have a considerably improved toughness and hardness. Especially suited herefor are the ceramic materials SiC—SiC or SiC-C with a silicon carbide matrix, reinforced with fibers also consisting of silicon carbide (SiC—SiC) or carbon (SiC-C). The workpiece is, for example, manufactured by initially breaking up a gaseous precursor which, upon its deposition, is ceramized in a preform produced by impregnation of a stack of adjacent fabric layers of silicon carbide fibers or carbon fibers, with the orifices in the peripheral wall preferably to be produced by laser beam penetration. Such a ceramic material can be used under non-oxidizing conditions at temperatures higher than 1,200° C. for SiC—SiC, and higher than 1,400° C. for SiC-C.

Achieving optimum results in processing high liquidus and low viscosity materials by internal centrifuging, with regard to the fiberization aggregate, does not only depend on the choice of a certain alloy. The required processing conditions also affect everything regarding the path of the molten mineral material and the devices safeguarding thermal conditions.

The materials in question frequently require specialized facilities from the very beginning, i.e. from the point of melting the raw materials. The intention here is not to enter into explanations of the melting techniques which do not lie within the scope of the invention. These techniques are explained in great detail in literature. It must nevertheless be underlined that even in preparation of the molten mineral materials, the attainable temperatures are particularly limited by the resistance of materials forming the melting or refining furnace. For these reasons, the molten mineral material is provided at temperatures generally not too high above those required for the transformation. This means that heat losses of the molten mineral material during procedural steps, up to the transformation into fibers, must be suppressed.

In practical conditions, the consequence is that the molten mineral material is thermally insulated on the way between melting furnace and spinner, and that the distance is kept short.

Heat losses consequently also occur upon contact with the spinner if the latter is not supplied with the energy required to keep it at operating temperature. In order to avoid excessive heat transfers, a variety of measures is employed during device startup and for ongoing operation.

Outside the spinner, this is in particular an annular external burner, preferably with internal combustion and producing an annular gas flow with an elevated temperature in the vicinity of the upper side of the peripheral wall. Preferably, the hot gas flow is not only directed in such a way as to pass along the peripheral wall of the transport means, but such that it also envelopes part of the connecting band or of the "tulip" connecting the peripheral wall with the flange which is used to fasten the spinner to its support shaft (in the case of a bottomless spinner), or with the upper reinforcing collar (in the case of a spinner driven via its bottom wall), such that these parts are heated, too.

For this purpose, supplementary burners may be used whose flames are directed at the connecting band or at the "tulip". Another solution is to arrange the external burner at a greater distance from the upper side of the peripheral wall, such that the gas flow is already somewhat dilated before approaching the spinner and reaching a noticeable part of the "tulip". Here, however, the distance should be kept so small that good precision of the impinging flow can be maintained. According to a third variant of the invention, an annular external burner may be used, the inner channel wall of which has a lesser diameter than the outer diameter of the spinner. In this case, for example, a burner with prolonged oblique discharge lips for delimiting a flaring jet of hot gases may be provided.

Again on the outer side of the spinner, preferably an induction heater is provided with an annular magnet for the passage of an electrical current with a high, or preferably a medium high, frequency. As known per se, the annular magnet may be arranged immediately below the spinner and concentrically to it. The combination of these two heating devices essentially contributes to a thermal balance of the spinner, and it must be noted that efficiency of these heating devices is better the more closely they are arranged near the spinner, and that in this way, the external burner predominantly heats the upper part of the centrifuge or spinner, whereas the annular magnet in its turn predominantly heats the bottom part of the spinner. As it was found that it is very difficult to heat the upper side of the peripheral wall without heating all the other nearby metal parts which in particular are enveloped by the hot gas flow, the described dual heating system avoids technological problems.

One further essential difference between these heating devices is their effect on the temperature in the vicinity of the spinner. The induction heater does not have a practical effect in this respect and therefore does not contribute to environmental heating apart from a small amount of heating by radiation. The annular external burner, on the other hand, inevitably must heat the environment to a considerable degree, although the secondary air sucked by the rotational movement of the spinner and the high speed of the annular gas flow in turn suppresses introduction of heat by the annular external burner into the environment. For optimum fiber quality, in particular under the aspect of the mechanical resistance, it is however not advantageous if the fibers are exposed to an excessively hot environment immediately after emanation from the spinner. Under these aspects, the temperature of the gas exhausted from the annular external burner is preferably limited.

Furthermore it is advantageous to work with relatively high spinner velocities. It is known that the relation of the resistive forces against viscous deformation to surface tension forces, which is responsible for the formation of drops or beads, is a function of the non-dimensional number $\mu \times V/\sigma$, with $\mu$ designating viscosity of the material, V its speed, and $\sigma$ its surface tension. Increasing the product of μxV, whether by lowering the temperature in order to increase viscosity, or by increasing the velocity of movement of the material, reduces the tendency to form non-fiberized particles such as drops or beads.

Preferably, attention must be paid not to heat the environment surrounding the spinner, but this requirement may have as consequence that the external heaters do not suffice to satisfactorily maintain the thermal balance of the spinner.

In such a case, heating devices may be added inside the spinner. This supplementary introduction of heat is preferably achieved by means of a diverging internal burner arranged concentrically to the support shaft of the spinner, the flames of which are directed at the inside of the peripheral wall. Preferably, the fuel/air ratio is adjusted such that the flame root is positioned in the immediate vicinity of the inner wall. A certain number of protrusions serving as flame retention means are furthermore advantageously provided at the inner wall of the "tulip". The diverging internal burner contributes preferably between 3 and 15% of the thermal input in ongoing, continuous operation—as far as it is not derived from the molten mineral material. This appears to be a contribution of only minor significance, but this heat input occurs with extraordinary precision, is arranged precisely at the required place, and is therefore extraordinarily efficient.

The diverging internal burner utilized during fiberization advantageously complements a central internal burner known from prior art where, however, it is exclusively employed during the startup phase and in principle intended to heat the bottom wall of the spinner—or of the distributing means serving as a bottom wall and usually referred to as a cup, or more generally, the central area of the spinner. The central internal burner pre-heats the cup or the bottom wall before feeding of the molten mineral material occurs. According to the invention, the central burner preferably is an annular burner with a converging flame, arranged between the spinner support shaft and the diverging central internal burner.

During the startup phase, it is understood that the external heating facilities are also used. If necessary, even flame lances or similar devices may be utilized as supplementary heaters. The diverging internal burner is, of course, also used during the critical startup phase while the thermal input of the molten mineral material is not yet available. During the startup phase, inner and outer burners are altogether used advantageously. The internal burners are possibly of a kind also seen in fiberization units for traditional glass fiber production. In such known fiberization units, the burner is arranged concentrically to the supporting shaft of the spinner. Other kinds of internal burners are applicable, too, in particular in order to compensate the specific spinner construction, as will be explained in more detail in the context of specific embodiments.

As the processed materials in certain cases have low viscosities compared to the viscosities of glasses usually processed by internal centrifuging, it is necessary to adjust the production capacity of each spinner orifice by correspondingly selecting the dimensions of the respective orifices. Thus the orifices usually have a diameter of between 0.7 and 1.2 mm in order to maintain a production capacity of about 1 kg per day and per orifice of glasses with viscosities in the order of 1,000 poises. For materials with viscosities below 500 poises, it is preferred to use a spinner with an orifice diameter larger than 0.1 mm, preferably larger than 0.15 mm, and in particular larger than 0.2 mm, however smaller than 0.7 mm, preferably smaller than 0.5 mm and in particular smaller than 0.4 mm.

Further details, features and advantages of the invention will be apparent from the following description of preferred embodiments in conjunction with the drawings.

A number of compositions useful for the production of mineral fibers is given in the table appended to this description. With the exception of composition 0, showing a conventional glass composition as usually fiberized by "internal centrifuging", all of the other materials have an elevated liquidus temperature and a low viscosity. Beside the main components of the composition, the table gives the liquidus temperatures, i.e. the values of thermal equilibrium corresponding to the lowest temperature at which crystals are not detected in the equilibrium. In order to determine this temperature, a sample of broken material is heated to the measurement temperature in a platinum crucible for a time span sufficient to produce a state of equilibrium (16 hours under practical conditions), then taken from the furnace and quenched to environment temperature, ground to form a thin chip and inspected under a microscope; the liquidus temperature then corresponds to the threshold temperature between the upper temperature range where no crystals can be found, and the lower range where the presence of crystals is noted.

With the exception of composition No. 26 which qualifies as a glass composition, all of the compositions in the table used according to the invention correspond to materials with high melting points, typically with liquidus temperatures between 1,200° C. and 1,400° C. Viscosity/temperature graphs for these various compositions are given in FIGS. 1 to 7. With regard to details of individual composition properties, the full disclosure of FIGS. 1 to 7 is herewith incorporated by reference into this specification disclosing the essentials of the present invention. The diagrams represent the decimal logarithm of viscosities $\mu$ (1 g $\mu$) in poises on the y-axis, and temperatures on the x-axis. The left-hand extremities of the graphs (except for glass 0) correspond to the lowest temperature for which viscosity can be measured with a viscosimeter with concentric tubes, the sample being gradually cooled.

The application limits for the invention are indicated by broken lines in the diagrams. The maximum applicable temperature depends on the resistance of the spinner alloys. For an acceptable operational life of ODS-type alloys, the upper limit is at 1,400° C.

The value of 1,200° C. representing the lower limit is not a strict borderline, but is based on the fact that this is the ultimate limit attainable by means of the known, usual "internal centrifuging" techniques if, beside other disadvantages, a very short operational life of the spinner is accepted. Under industrial conditions, this value is by far not attainable in any economical way by known and usual "internal centrifuging" techniques.

Beyond 3,000 poises (1 g $\mu$=3.47), the composition can no more be processed satisfactorily with the techniques in question, as the material no longer flows through the orifices in the required manner. This upper limit does not signify a practically important limitation insofar as the investigated compositions have far lower viscosities within the temperature range contemplated by the invention.

The lower limit of 100 poises is very important. As mentioned earlier, it becomes practically impossible in any case below this viscosity, but frequently already at viscosities of less than 200 poises (1 g $\mu$=approx. 2.3) or even 350 poises (1 g A=approx. 2.5), to successfully attenuate the filaments emanating from the orifices into fibers. In order to achieve a reasonable safety margin towards these low viscosities prohibiting fiberization by internal centrifuging, it is preferable to work with those compositions allowing processing at viscosities from 300 to 350 poises.

For better illustration of the problems during low-viscosity glass processing, experiments were conducted with a reference glass having a viscosity at 950° C. that corresponds to the one of basaltic composition No. 25 at 1,250° C., and which furthermore has a viscosity/temperature graph analogous to the one of composition No. 25. These experiments were conducted by means of a 200-mm spinner as known from FR-A-2 443 436, with the quantity of discharged glass lying between 0.2 and 0.65 kg per day and orifice. The gas flow generated by the annular external burner had a blast temperature of between 700 and 1,000° C., and a blast pressure of between 20 and 100 mm water column. The results obtained have been reproduced in the following table, with viscosity given in poises and the rotating velocity of the spinner in revolutions per minute. In the "Beads" column, the first item is the percentage in weight percent of unfiberized particles larger than 100 μm, followed in parentheses by the weight percentage of particles larger than 40 μm. Fiber fineness is expressed by the Micronaire value below 5 g.

| Viscosity | RPM | Beads | Fiber fineness F/5g |
|---|---|---|---|
| 1,800 | 3,000 | 1.27% (2.45%) | 3.7 |
| 520 | 3,000 | 1.25% (1.75%) | 3 |
| 150 | 3,000 | 7.7% (8.9%) | 3.6 |
| 70 | 3,000 | 10.5% (14%) | >8 |
| 1,060 | 2,000 | 1.8% (2.4%) | 3.3 |
| 360 | 2,000 | 1.9% (2.8%) | 3.3 |
| 150 | 2,000 | 45.9% (47%) | 6.8 |

As shown in the above table, the bead proportion at a viscosity adjusted to more than 350 poises, independent of the spinner rotating velocity, is distinctly below 5 weight percent. In this case it is possible to improve fiber fineness by raising the rotating velocity of the spinner and/or the external burner pressure and/or the attenuating gas temperature. For viscosities of less than 100 poises, the bead content becomes very considerable even at high rotating velocities of the spinner, while in addition the achieved fibers show insufficient fineness, practically rendering them unsuited for insulation uses.

Between 70 and 360 poises, high quality fibers can be achieved if a high rotating velocity is employed and a bead content between 5 and 10 weight percent is accepted.

In order to enable use of a composition in the scope of the invention, one must aim for a maximum length of the viscosity/temperature graph to lie inside the area defined by the limits discussed above.

Compositions 22 and 23, listed as examples of compositions practically not attenuable with the teaching according to the invention, are thus excluded. It can furthermore be seen that composition 21 has only a very small portion of its viscosity/temperature graph inside the defined area and is therefore very difficult to fiberize. Compositions 17, 18, 20, 24 and 25 are in the border area of the conditions required for selection according to the invention as they cannot be processed at viscosities of more than 350 poises, and therefore yield relatively unsatisfactory products with a bead content of e.g. more than 10 weight percent.

Compositions 3, 10, 11 and 14 only have very small sections of their viscosity/temperature graphs inside the preferred viscosity area of more than 300/350 poises, thereby making it difficult to maintain a constant temperature within a range of at least 50° C. over the entire peripheral wall of the spinner and in continuous operation.

With regard to compositions 8 and 12, it must be noted that they require a high performance spinner which permits an operational temperature in excess of 1300° C.

The remaining compositions offer a work range in the area between 1,200 and 1,300° C., with a safety margin of at least 50° C. at a viscosity of the material to be fiberized between 350 and 3,500 poises. They show a very broad work range, enabling comfortable utilization across several tens of degrees, and can be employed more easily than the compositions described earlier.

Composition 26 does not even enter into the defined work range as it corresponds to a comparatively low liquidus glass (even though more than 1,050 to 1,100° C. are traditionally already referred to as elevated liquidus temperatures; a typically used glass composition, like composition 0, has a liquidus temperature of only 920° C.). This composition, however, also permits utilization of the advantages of to the invention as it has a viscosity of less than 3,200 poises at its liquidus temperature and may still be fiberized by means of "internal centrifuging" at a viscosity of more than 100 poises.

Figure 8A:
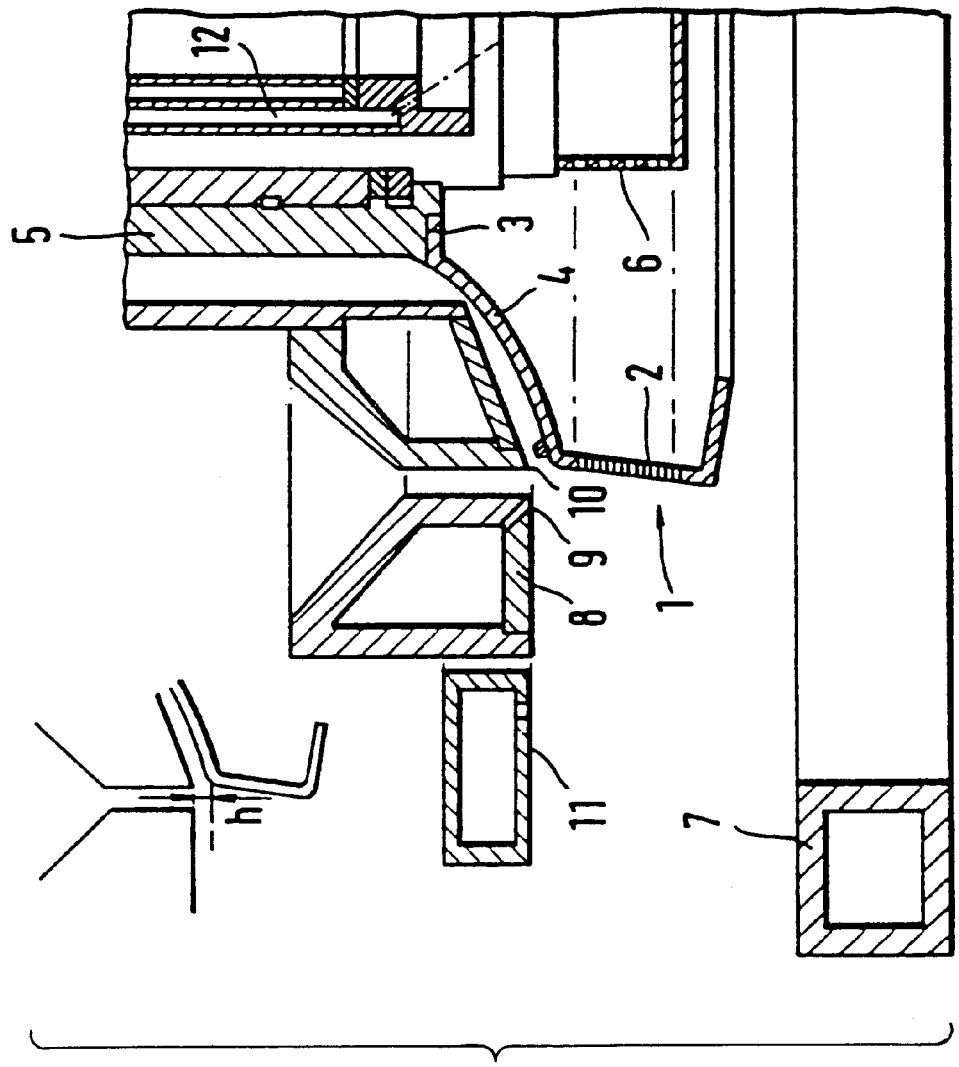
FIG. 8a is a schematized, longitudinal sectional view showing a fiberization device for the production of glass fibers known from prior art.
Figure 9:
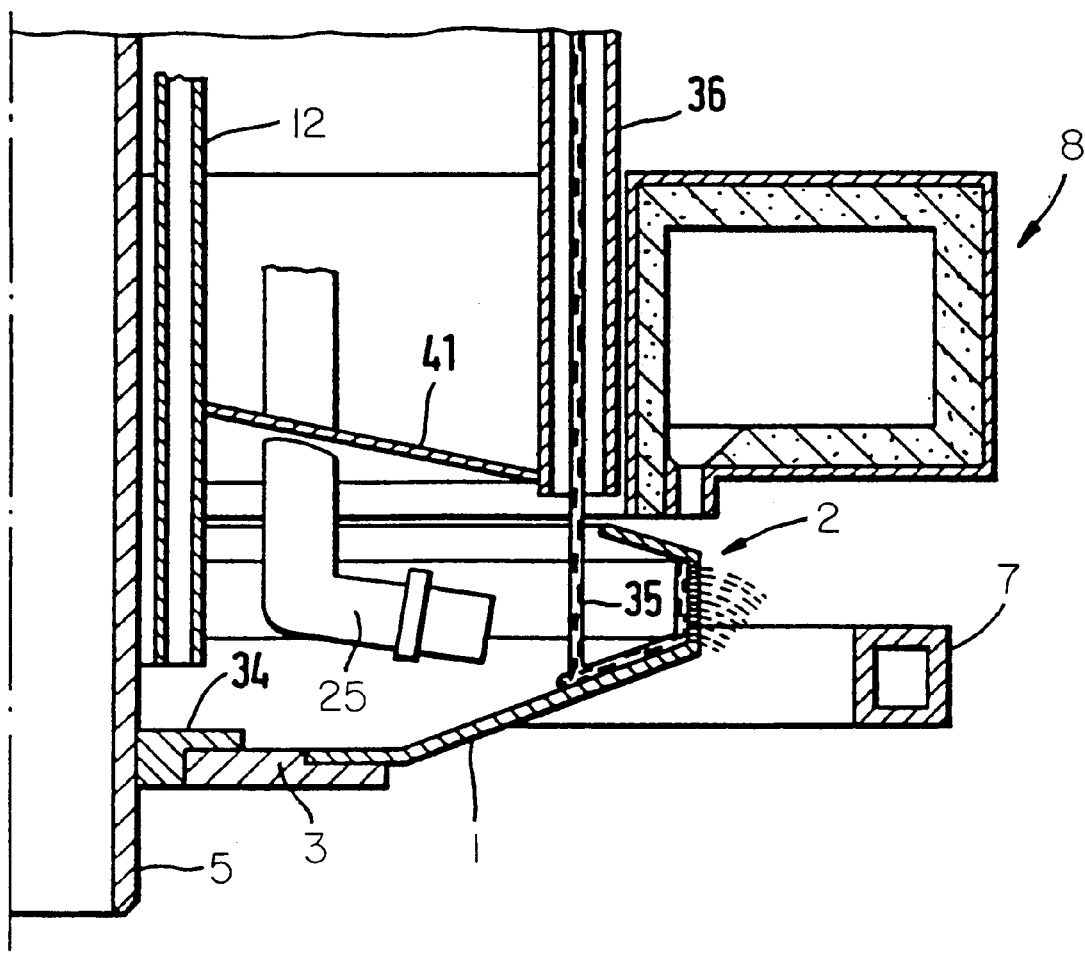
FIG. 9 is a representation, corresponding to FIG. 8b, of a different embodiment of a fiberization device according to the invention.

Application of the present invention shall now be explained more closely by FIGS. 8 and 9 showing schematic views of fiberization units.

FIG. 8a shows a unit corresponding in its principal structure to the type hitherto used in prior art for the production of glass fibers intended in particular for insulation purposes. This type of fiberization device has been described in detail in many instances, e.g. in FR-A-2 443 436 and EP-A-0 091 381.

In the usual manner, and as illustrated in detail in FIG. 8a, the fiberization device essentially consists of a spinner 1, the peripheral wall 2 of which has a multiplicity of discharge orifices. The peripheral wall 2 is connected to a flange 3 via a connecting band 4, referred to as a "tulip" because of its shape. As illustrated by the drawing, peripheral wall 2, tulip 4 and flange 3 are formed as a whole in one single, unitary piece.

Flange 3 is mounted on a supporting shaft 5 which is hollow in the shown embodiment, and through this cavity the molten mineral material is supplied.

The supporting shaft 5—or even the flange 3—furthermore supports a concentric distributing means 6, usually referred to as a "cup". The distributing cup 6, with a peripheral wall which has a relatively low number of orifices with comparatively large diameters, serves as the bottom wall of the spinner 1 and distributes the molten mineral material in such a way that the centrally supplied stream of molten mineral material is separated into a plurality of streamlets and distributed onto the inner circumference of peripheral wall 2.

The spinner 1 is surrounded by diverse heating devices: an annular magnet 7 of an induction heater which particularly heats the bottom portion of the spinner 1, above all in order to compensate cooling upon contact with environmental air which is strongly cooled by the considerable quantities of air sucked by the revolution of the spinner 1 and by a water cooled annular external burner 8. The ends of channel walls 9 and 10 of the external burner 8 are arranged at a slight vertical distance h from the spinner 1, for instance in the order of 5 mm, as shown in a simplified manner by the sketch at the top left side of FIG. 8a.

The annular external burner 8 generates a high temperature and high velocity gas flow substantively directed vertically downwards and thus passing along peripheral wall 2. The gas flow on one hand serves to heat, or maintain the temperature of peripheral wall 2, and on the other hand contributes to attenuating the filaments of spun-off molten mineral into fibers.

As represented in the drawing, the external burner 8 preferably is surrounded by a blower ring 11 for cold air, e.g. pressurized air, the main objective of which is to limit radial expansion of the hot gas flow and thereby keep the formed fibers from getting into contact with the annular magnet 7.

These external heaters of spinner 1 are complemented in its inside by an internal annular burner 12 which is positioned inside the supporting shaft 7 and utilized merely during the startup phase of the fiberization unit for preheating the cup 6.

As illustrated by FIG. 8b, a fiberization device according to the invention consists of the same components, and only the differences shall be discussed in the following.

The most striking difference concerns the position of the annular external burner shown at 8, with channel walls 9 and 10, the ends of which are positioned at a distance h' above the peripheral wall shown at 2, which is distinctly larger than the distance h according to FIG. 8a. These relations, too, are illustrated in a simplified manner by the sketch at the top right side of FIG. 8b. For example, a distance h' in the range of 15 to 30 mm, particularly in the range of 20 to 25 mm is preferred as such a distance still permits a high flow accuracy of the gas flow.

Furthermore, the inner channel wall 9 has a diameter which is distinctly smaller than the diameter of the top side of peripheral wall 2. In order to guide the gas flow upon emission, the discharge orifice of external burner 8 is limited by two oblique surfaces 16 and 17 at right angles to each other, thus for example inclined to the outside by app. 45°. In order to limit the problems with radial expansion of the hot gas from external burner 8, the outer oblique surface 17 is only about half as long as the inner oblique surface 16 and ends in an essentially vertical wall 18. The oblique surface 16 and the wall 18 end at a height above the spinner that essentially corresponds to the vertical distance h of channel walls 9 and 10 of a conventional external burner 8 (cp. FIG. 8a).

With such an arrangement of external burner 8, not only the peripheral wall 2 of the spinner 1, but also the tulip 4 is being heated. The gas flow, however, should not rise along the tulip 4 and heat the supporting shaft 5 of the spinner, now shown at 1'. In order to avoid this, an annular protrusion 21 or a different, revolving sealing element can be provided here to be arranged, for instance, at half the height of tulip 4, with this position determining the length of tulip 4 which is heated by the annular gas flow. It is also possible to pressurize the gap between the supporting shaft 5 and a peripheral wall 23. For this purpose, for instance, cold air can be introduced at the top side of supporting shaft 5, this introduction more specifically being preferred in a direction perpendicular to the axis of revolution as merely a fluid barrier is to be obtained hereby, and not a stream of cold air directed at the tulip 4.

A comparison between FIGS. 8a and 8b shows one more essential difference consisting in that a second internal burner 25 has been provided which is positioned concentrically around the central inner annular burner 12 and, as usually, serving to heat the cup 6. The second internal burner 25 is an annular burner with diverging flames which are directed at the inner surfaces of the peripheral wall 2 and of the tulip 4. The arrangement of flames is preferably optimized by protrusions 29 on the inside of tulip 4 which serve as flame retention means.

In the case of the embodiment in FIG. 8b, the cup 6 has a relatively thick bottom wall 28 which for instance is formed of a ceramic plate or heat resistant concrete in order to avoid rapid erosion by the molten mineral material. In addition, the thick bottom wall 28 serves as a heat insulation and thereby prevents cooling of the inside of the bottom wall due to gas or air flow induced or sucked in by the rotation of the spinner 11.

The operating principles of the device according to the invention shall now be explained in detail.

Before taking up production, heating of the cup 6 and of the spinner 1' is performed until a temperature has been achieved at which the molten mineral material will not solidify before emanating from the orifices of the spinner 1'. When a suitable temperature has been reached which ideally should differ only for a minimum amount from the temperature during ongoing, continuous operation, such that stationary operating condition can be reached as quickly as possible without the molten mineral material substantively cooling down, then passage of the molten mineral material into the spinner 1' is permitted.

The molten mineral material impinges on the bottom wall 28 of the cup 6, emanates through the orifices of the cup 6 in its peripheral wall, and is flung onto the inner side of the peripheral wall 2 of the spinner 1'.

Distribution of the molten mineral material by the cup 6 is determined by two contradictory requirements. On one hand, it is desirable to keep the number of the orifices of the cup 6 relatively small in order to prevent the molten mineral material from cooling down considerably on its way from the cup 6 to the peripheral wall 2 of the spinner 1'. If, however, the molten mineral material is concentrated onto a small number of orifices of the cup 6, then this will lead to locally limited impact points on the inner surface of peripheral wall 2 of the spinner 1', with the danger of rapid erosion of the material of the spinner 1' in these places. This danger is further increased, as will be shown in more detail below, by a more strictly limited "reserve" of molten mineral material in the spinner 1', such that the impact is less moderated by this reserve acting as a cushion.

Passage of the molten mineral material through the spinner 1' is kept as short as possible in order to minimize the dangers of solidification. Here the target must be—on top of shortening the path of the molten mineral material inside the spinner 1'—to keep as small as possible the quantity of molten mineral material remaining along the inside of the peripheral wall 2 before passage through the orifices.

This reserve of molten mineral material is indirectly determined by the flow of the supplied molten mineral material, its temperature, and thus its lesser or greater fluidity, and by the centrifugal acceleration. For example, the average quantity of the molten mineral material remaining inside the spinner 1' should not exceed the production quantity of one minute, preferably not of 30 seconds.

Maintaining an adequate temperature of the molten mineral material until it is flung off the spinner requires supplementary, in particular thermal conditioning inside the environment surrounding the spinner, in such a way that both attenuation of filaments into fibers and solidification of the attenuated fibers are guaranteed.

The temperature of the molten mineral material should swiftly be taken to a value below the value at which the fibers remain solid. Nevertheless, solidification should not occur instantaneously, as in such a case sufficient attenuation would not be possible.

Temperature main control in this phase is conducted by means of such a heating device which takes effect in the surroundings of the spinner in that zone where attenuation of the fibers occurs.

When selecting a temperature, as a matter of course, one must take those values into account whereat the material is attenuable and solidifiable. Furthermore, the fact that the gas escaping from the burner mixes with the air sucked from the environment has to be considered.

Under practical conditions, attenuation of the fibers is effected within a small distance after leaving the spinner.

The discharge quantity of the gases should be sufficient to maintain the selected conditions in the entire surrounding atmosphere zone in which the fibers are attenuated.

The arrangement represented in FIG. 9 differs from the one according to FIG. 8 essentially in that feeding the molten mineral material is not done axially, but directly into the spinner, without passage through a distributing cup.

The arrangement according to FIG. 9 has a spinner 1 which is fastened to a supporting shaft 5 via a flange 3 and a shaft collar 34 in the manner shown schematically. The fastening means as such are not illustrated in detail.

The spinner 1 is open on its top side. Molten mineral material 35 is supplied by gravity and enters in a continuous stream from the forehearth. The molten mineral material 35 is protected on its way by a bushing 36 until it enters the spinner 1.

The arrangement, like in the case of the one according to FIG. 8, has several installations for controlling the temperatures of the molten mineral material and the device during the various work steps.

Above all, there are outside of the spinner 1 an annular external burner 8 and an annular magnet 7 for induction heating. Depending on requirements in individual cases, auxiliary burners may be employed temporarily during production startup in order to get the spinner 1 to a sufficient temperature before the molten mineral material is entered into the spinner 1. These auxiliary burners are not illustrated in detail.

Inside the spinner 1, as in the embodiment according to FIG. 8, an internal burner 12 may be provided which is arranged concentrically relative to the support shaft 5. The bottom wall of the spinner 1 preferably is provided with orifices in order to permit emanation of gases.

If the molten mineral material 35 has to be heated immediately before passing through the orifices of spinner 1, then such burners may be used as shown at 25 in FIG. 9, which direct a flame at the peripheral wall inner surface of the spinner 1. Other than suggested by the representation in FIG. 9, it is preferred to position the burners 25 offset from the stream of molten mineral material 35, such that they cannot disturb influx of the molten mineral material.

As in the case of the embodiment according to FIG. 8, the diverging burner 25 can be supplemented by the central internal burner 12.

Walls 41 shown schematically in FIG. 9 may be arranged to protect the spinner 1 inner space optimally against the environment temperature.

The molten mineral material 35 impinges on the spinner 1 in an area forming the bottom wall of the spinner 1. From there, the molten mineral material covers the inner surface of the peripheral wall of the spinner 1 shown at 2 due to a centrifugal effect.

It should be emphasized that in this arrangement, the path of the molten mineral material 35 while in contact with the spinner 1 is very short.

Just as in the embodiment according to FIG. 8b, the annular external burner 8 with internal combustion, which has the main function of adjusting thermal conditions in the surroundings of the circumference of the spinner 1, prevents considerable cooling of peripheral wall 2 of the spinner 1, in particular at its top portion. Just like in the preceding embodiment, induction heating by means of the annular magnet 7 serves the purpose of heating the bottom portion of the spinner 1.

By way of experiment, as stated above, fibers have been manufactured with a spinner made of an austenitic ODS steel. In this case, the spinner had a diameter of 200 mm and was equipped with 9,000 discharge orifices in its periphery. The diameter of the orifices was 0.5 mm. The orifices were arranged in 20 rows. The arrangement was of the kind illustrated in FIG. 8b to the description whereof reference is made in order to avoid repetitions.

Experimental conditions for the various compositions were slightly different. As examples, those conditions giving good results for the composition 2 explained above will be given.

The initial temperature of the molten mineral material during feeding to the spinner was 1,550° C. The discharge amount amounted to 3,000 kg/day.

At first, the external burner was adjusted to provide an attenuating gas flow at 1,400° C. under a blast pressure of 345 mm water column.

The rotating velocity of the spinner was 3,000 rpm.

Under these conditions, basalt wool with a fiber fineness of a Micronaire value of 3/5 g or a Faconnaire value of 400/5 g was produced (determination of Micronaire and Faconnaire values are usual methods for characterizing fiber fineness as presently used by mineral wool producers; with regard to details, the German Industrial Standard (DIN) 53941 "Bestimmung des Micronaire" (Micronaire reading) and to the Standard ASTM D 1448 "Micronaire reading of cotton fibers" are incorporated herein by way of reference). The content of unfiberized materials with diameters of 100 $\mu$m or more was below 0.8 weight percent, which is extremely low in comparison with results of "external centrifuging". The quality of the fibers was altogether extremely satisfactory.

In general, it can be said that with suitable selection of the working conditions, the process according to the invention yields mineral mats on the basis of basalt, rock etc., with less than 5 weight percent of unfiberized particles (beads) having a diameter of more than 100 $\mu$m.

Nevertheless, it is extremely important to closely control temperature distribution.

As already mentioned above, a distinct increase in temperature, e.g. by raising burner temperature to 1,600° C., leads to a distinct increase in the proportion of unfiberized particles.

Vice versa, lowering the spinner temperature may lead to clogging of its peripheral discharge orifices.

Experiments conducted with the other compositions confirm the above results.

|  | 1 | 2 | 3 | 4 | 5 | 6 | 7 | 8 | 9 | 10 | 11 |
|---|---|---|---|---|---|---|---|---|---|---|---|
| $SiO_2$ | 50.45 | 51.5 | 49.40 | 52.9 | 54.93 | 56.0 | 52.26 | 52.65 | 49.40 | 47.90 | 47.5 |
| $Fe_2O_3$ | 10.35 | 10.1 | 11.75 | 15.2 | 8.3 | 12.18 | 7.6 | 6.5 | 10.10 | 9.80 | 9.7 |
| $Al_2O_3$ | 17.35 | 18 | 15.8 | 13.6 | 17.17 | 14.37 | 18.96 | 19.85 | 17.00 | 16.40 | 16.3 |
| MnO | 0.17 | 0.19 | 0.2 | 0.2 | 0.15 | 0.23 | 0.1 | 0.1 | 0.15 | 0.15 | 0.16 |
| CaO | 9.90 | 8.9 | 10.80 | 5.75 | 7.12 | 6.3 | 6.52 | 5.3 | 9.70 | 9.4 | 12.4 |
| MgO | 7.05 | 6.4 | 6.4 | 3.8 | 5.10 | 4.48 | 4.31 | 3.3 | 6.90 | 6.70 | 6.7 |
| $Na_2O$ | 3.35 | 3.5 | 3.1 | 2.7 | 3.55 | 3.2 | 5.52 | 6.1 | 3.25 | 3.15 | 3.20 |
| $K_2O$ | 0.45 | 0.61 | 0.4 | 2.20 | 2.19 | 1.49 | 4.11 | 5.5 | 0.45 | 0.40 | 0.40 |
| $TiO_2$ | 0.75 | 0.66 | 2.1 | 3.0 | 1.20 | 1.33 | 0.5 | 0.5 | 0.75 | 0.70 | 0.70 |
| $P_2O_5$ | 0.15 | 0.12 | — | 0.6 | 0.28 | 0.34 | 0.1 | 0.1 | 0.15 | 0.14 | 2.9 |
| $B_2O_3$ | — | — | — | — | — | — | | | 2.15 | 5.25 | |
| Liquidus | 1310° C. | 1290° C. | 1220° C. | 1330° C. | 1270° C. | 1290° C. | 1290° C. | 1310° C. | 1260° C. | 1230° C. | 1210° C. |

|  | 12 | 13 | 14 | 15 | 16 | 17 | 18 | 19 | 20 | 21 |
|---|---|---|---|---|---|---|---|---|---|---|
| $SiO_2$ | 55.3 | 52.60 | 46.55 | 48.77 | 50.80 | 47.01 | 56.3 | 58.54 | 61.2 | 58.1 |
| $Fe_2O_3$ | 7.78 | 8.75 | 8.78 | 8.80 | 8.80 | 12.1 | 0.25 | 0.19 | 6.1 | 0.15 |
| $Al_2O_3$ | 19.1 | 14.58 | 14.7 | 14.65 | 14.65 | 14.7 | 3.15 | 3.85 | 0.1 | 3.1 |
| MnO | 0.12 | 0.12 | 0.17 | 0.17 | 0.17 | 0.24 | — | 0.03 | 0.01 | |
| CaO | 10.4 | 12.20 | 12.25 | 12.25 | 12.25 | 10.1 | 26.1 | 25. | 18.6 | 21.2 |
| MgO | 3.9 | 6.33 | 6.2 | 6.2 | 6.2 | 8.6 | 6.4 | 9.25 | 9.3 | 14.8 |
| $Na_2O$ | 1.8 | 2.24 | 2.2 | 2.2 | 2.2 | 3.06 | 3.2 | 0.05 | 4.5 | |
| $K_2O$ | 0.68 | 1.05 | 1.02 | 1.02 | 1.01 | 1.40 | 0.65 | 0.08 | 0.04 | |
| $TiO_2$ | 0.83 | 1.82 | 1.89 | 1.9 | 1.9 | 2.6 | 0.1 | 0.02 | 0.14 | 0.14 |
| $P_2O_5$ | — | 0.30 | 6.21 | 4 | 2 | — | 2.9 | 2.85 | — | |
| $B_2O_3$ | — | — | — | — | — | — | — | 0.05 | — | 2.5 |
| Liquidus | 1210° C. | 1270° C. | 1230° C. | 1220° C. | 1230° C. | 1230° C. | 1300° C. | 1290° C. | 1330° | 1360° C. |

|  | 22 | 23 | 24 | 25 | 26 | 27 | 28 | 0 |
|---|---|---|---|---|---|---|---|---|
| $SiO_2$ | 56.4 | 47.2 | 53 | 49.3 | 60.7 | 58.3 | | 63 |
| $Fe_2O_3$ | 0.3 | 3 | 2.7 | 8.4 | | 0.14 | | 0.3 |
| $Al_2O_3$ | 3.4 | 6.9 | 6.4 | 15.6 | 0.2 | 7 | | 3 |
| MnO | | | | | | | | |
| CaO | 21.7 | 20.7 | 30 | 13.9 | 16.5 | 24.85 | | 7.35 |
| MgO | 4.55 | 14.4 | 3. | 7.6 | 3.2 | 5 | | 3.1 |
| $Na_2O$ | 9 | 6.5 | 3.1 | 3.5 | 15.4 | 0.02 | | 14.1 |
| $K_2O$ | 1.1 | 0.7 | 1.1 | 0.5 | 0.7 | 0.05 | | 0.8 |
| $TiO_2$ | 0.1 | 0.4 | 0.5 | 1.0 | | 0.14 | | |
| $P_2O_5$ | | | 0.2 | | 3.3 | 4.5 | | 5.9 |
| $B_2O_3$ | | | | | | | | |
| Liquidus | 1230° C. | 1300° | 1350° C. | 1230° C. | 1120° C. | >1300° C. | | 920° C. |

What is claimed is:

1. A device for fiberization by means of internal centrifuging comprising:

(1) a spinner having a peripheral wall with a multiplicity of orifices for centrifuging a molten mineral material, at a temperature of less than 1,400° C. and a viscosity in excess of 100 poises, to form filaments, (2) an annular external burner arranged concentrically to said spinner for producing a gas flow along the peripheral wall of said spinner to supplementally attenuate said filaments, (3) an annular burner arranged inside said spinner for ongoing operation during fiberization, said annular burner having diverging flames which are directed at the inner surface of the peripheral wall of said spinner, and (4) a skirt having a curved surface located at the upper end of the peripheral wall of said spinner, and one or more flame retention means, positioned at an inner surface of said skirt, for keeping the diverging flames of said annular burner in a vicinity of the inner surface of said peripheral wall of said spinner.

2. The device of claim 1, wherein said annular external burner comprises a linear channel portion comprising discharge channel walls for a hot gas flow and said annular external burner comprises oblique walls located at the end of said linear channel portion for delimiting a flaring discharge flow of the hot gases.

3. The device of claim 2, further comprising a sealing protrusion or rotating seal for preventing back flow of the hot gases along a supporting shaft of said spinner.

4. The device of claim 3, further comprising a fluid seal generated at the free end of said supporting shaft for preventing back flow of the hot gases along the supporting shaft of said spinner.

5. The device of claim 1, further comprising an annular induction heater for heating said spinner.

6. The device of claim 1, further comprising a distributing means, wherein a bottom wall of said distributing means is protected by a plate of a heat resistant insulating material.

7. The device of claim 1, wherein said orifices of said spinner have a diameter in the range of 0.15 mm and 0.4 mm.

8. The device of claim 1, wherein said spinner comprises an oxide dispersion strengthened alloy.

9. The device of claim 8, wherein said oxide dispersion strengthened alloy is an austenitic alloy comprising: 15 to 35% by weight Cr; 0 to 1% by weight C; 0 to 2% by weight Al; 0 to 3% by weight Ti; less than 2% by weight Fe; 0.2 to 1% by weight $Y_2O_3$; and the remainder Ni.

10. The device of claim 8, wherein said oxide dispersion strengthened alloy is a ferritic alloy comprising: 13 to 30% by weight Cr; 2 to 7% by weight Al; less than 1% by weight Ti; 0.2 to 1% by weight $Y_2O_3$; and the remainder Fe.

11. The device of claim 1, wherein said spinner comprises a ceramic material.

12. The device of claim 11, wherein said spinner comprises a silicon nitride ceramic material.

13. The device of claim 11, wherein said spinner comprises an SiC—SiC ceramic material or an SiC-C ceramic material.

14. The device of claim 1, wherein said annular external burner comprises a discharge channel wall with a diameter smaller than the diameter of an upper side of said peripheral wall of said spinner.

15. A device for fiberization by internal centrifuging comprising:

(1) a spinner having a peripheral wall which has a multiplicity of orifices for centrifuging a molten mineral material, at a temperature less than 1,400° C. and a viscosity in excess of 100 poises, to form filaments, a skirt having a curved surface located on an upper end of the peripheral wall of said spinner and one or more flame retention means which are positioned on an inner surface of said skirt for keeping the flames of an internal annular burner in a vicinity of the inner surface of said peripheral wall of said spinner, and (2) an annular external burner arranged concentrically to said spinner for producing a gas flow along the peripheral wall of said spinner to supplementally attenuate said filaments, wherein said annular external burner comprises a linear channel portion and oblique walls located at the end of said linear channel portion, the end of said linear channel portion being positioned at a distance of 15 to 30 mm above said peripheral wall of said spinner and said annular external burner comprises a discharge channel wall with a diameter smaller than the diameter of an upper side of said peripheral wall of said spinner.

16. The device of claim 15, wherein said oblique walls delimit the flaring discharge flow of the hot gases.

17. The device of claim 16, further comprising a sealing protrusion or rotating seal for preventing back flow of the hot gases along a supporting shaft of said spinner.

18. The device of claim 17, further comprising a fluid seal generated at the free end of said supporting shaft for preventing back flow of the hot gases along the supporting shaft of said spinner.

19. The device of claim 15, further comprising an annular induction heater for heating said spinner.

20. The device of claim 15, further comprising a distributing means, wherein a bottom wall of said distributing means is protected by a plate of a heat resistant insulating material.

21. The device of claim 15, wherein said spinner comprises an oxide dispersion strengthened alloy.

22. The device of claim 21, wherein said oxide dispersion strengthened alloy is an austenitic alloy comprising: 15 to 35% by weight Cr; 0 to 1% by weight C; 0 to 2% by weight Al; 0 to 3% by weight Ti; less than 2% by weight Fe; 0.2 to 1% by weight $Y_2O_3$; and the remainder Ni.

23. The device of claim 21, wherein said oxide dispersion strengthened alloy is a ferritic alloy comprising: 13 to 30% by weight Cr; 2 to 7% by weight Al; less than 1% by weight Ti; 0.2 to 1% by weight $Y_2L\ O_3$; and the remainder Fe.

24. The device of claim 15, wherein said spinner comprises a ceramic material.

25. The device of claim 24, wherein said spinner comprises a silicon nitride ceramic material.

26. The device of claim 24, wherein said spinner comprises an SiC—SiC ceramic material or an SiC-C ceramic material.

27. The device of claim 15, wherein the spinner has a peripheral wall having a multiplicity of orifices having a diameter in the range of 0.15 mm to 0.4 mm.

* * * * *